(12) United States Patent
Adams et al.

(10) Patent No.: US 7,645,970 B2
(45) Date of Patent: Jan. 12, 2010

(54) FLIGHT CONTROL SYSTEM AND METHOD OF USING PIEZOELECTRIC MODAL SENSORS TO MITIGATE FLEXIBLE BODY DYNAMICS

(75) Inventors: Robert Adams, Tucson, AZ (US);
William Schwind, Tucson, AZ (US)

(73) Assignee: Raytheon Company, Waltham, MA (US)

(*) Notice: Subject to any disclaimer, the term of this patent is extended or adjusted under 35 U.S.C. 154(b) by 290 days.

(21) Appl. No.: 11/623,196

(22) Filed: Jan. 15, 2007

(65) Prior Publication Data

US 2008/0169384 A1 Jul. 17, 2008

(51) Int. Cl.
*G05D 1/00* (2006.01)
*B64C 13/16* (2006.01)

(52) U.S. Cl. ..................... 244/3.15; 244/195

(58) Field of Classification Search ............... 244/99.8, 244/195, 194, 177, 178, 3.1, 3.15, 3.21
See application file for complete search history.

(56) References Cited

U.S. PATENT DOCUMENTS

| | | | | |
|---|---|---|---|---|
| 4,054,254 A | * | 10/1977 | Cole | .................. 244/3.21 |
| 5,072,893 A | | 12/1991 | Chakravarty et al. | |
| 7,258,307 B2 | * | 8/2007 | Enzinger et al. | ............ 244/195 |
| 2003/0001462 A1 | * | 1/2003 | Lee et al. | .................. 310/365 |
| 2003/0098761 A1 | * | 5/2003 | Takeuchi et al. | ............ 333/189 |
| 2003/0205644 A1 | * | 11/2003 | Najmabadi et al. | .......... 244/195 |

OTHER PUBLICATIONS

C.K. Lee, Piezoelectric Laminates: Theory and Experiments for Distributed Sensors and Actuators, Intelligent Structural Systems, Kluwer Academic Publishers 1992, pp. 75-107 and 114-125.

* cited by examiner

*Primary Examiner*—Michael J. Carone
*Assistant Examiner*—Richard R Green
(74) *Attorney, Agent, or Firm*—Eric A. Gifford

(57) ABSTRACT

A flight control system is provided with one or more modal sensors that are each configured to measure the rate and possibly acceleration for a flexible body mode of the flight vehicle. The modal sensor's rate and suitably acceleration are subtracted from the rate and acceleration measured by the IMU such that the values provided to the flight controller more closely represent only the rate and acceleration of the flight vehicle's rigid airframe component. A piezoelectric modal sensor is capable of sensing a particular flexible body mode over variations in the modal frequency without inducing additional phase loss in the control loop in order to maintain suitable phase and gain margins. Sensors are suitably provided for at least and possibly only the $1^{st}$ lateral bending modes in the pitch and yaw channels.

17 Claims, 11 Drawing Sheets

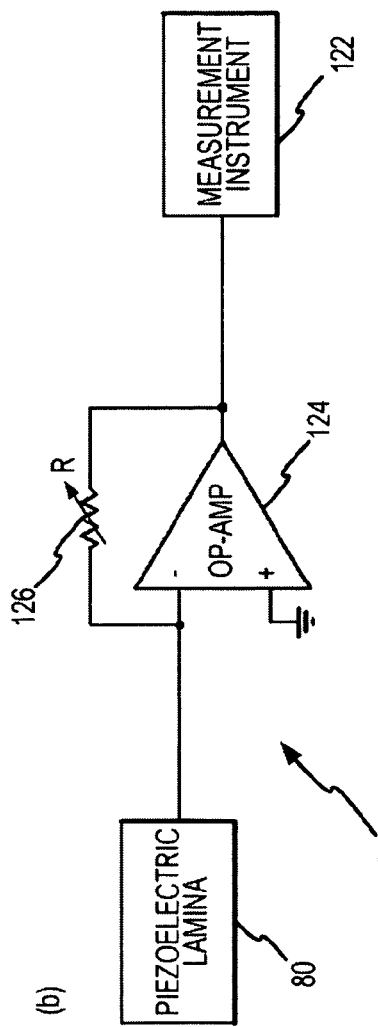
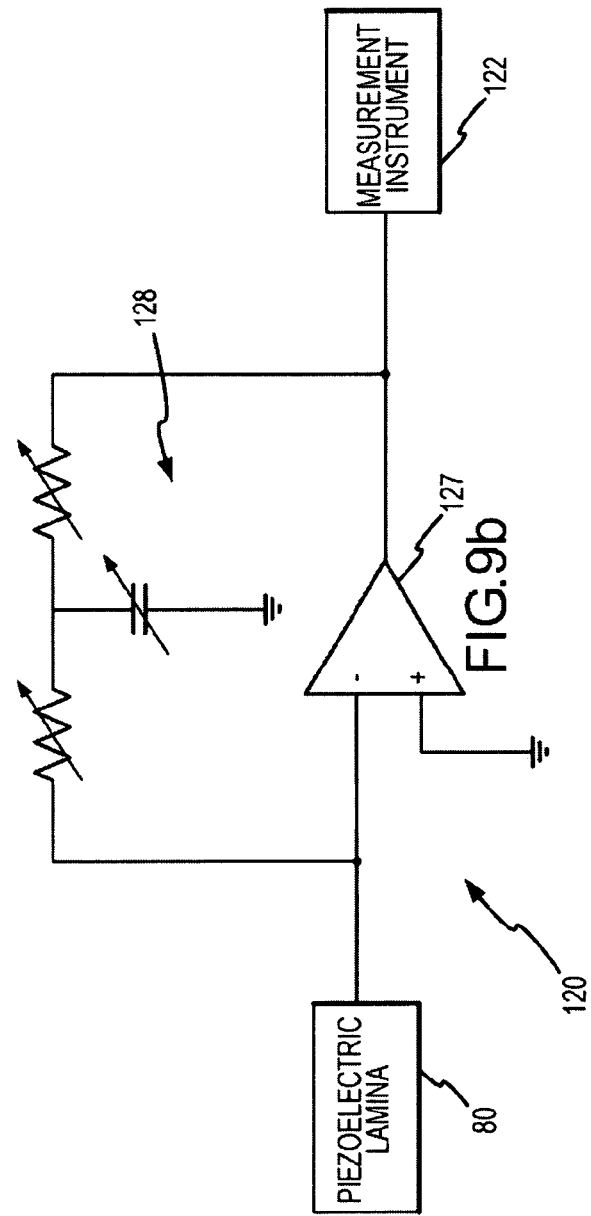
FIG.9a (PRIOR ART)
FIG.9b

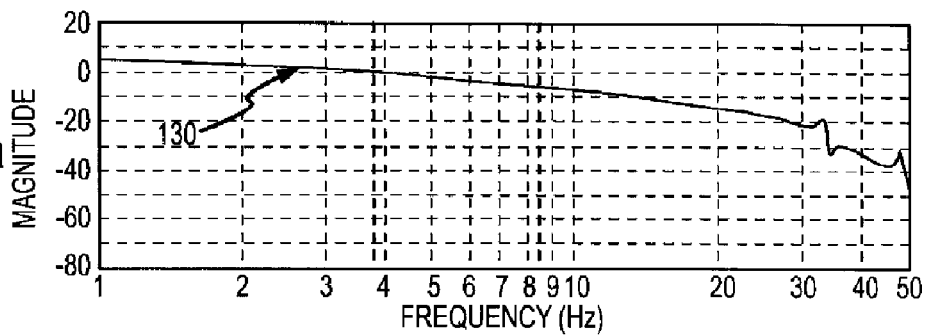
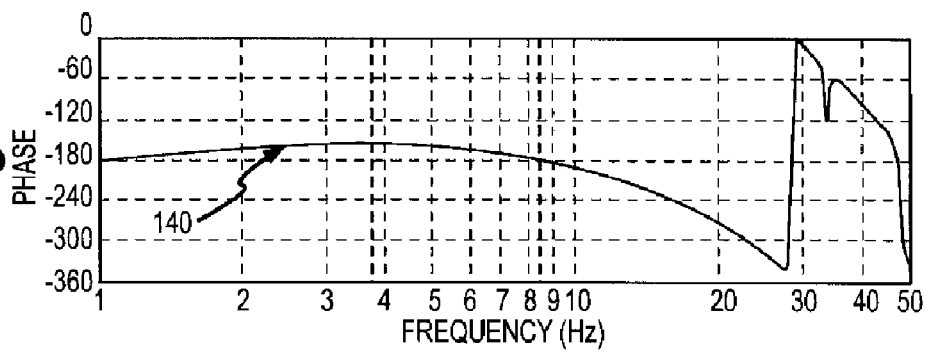
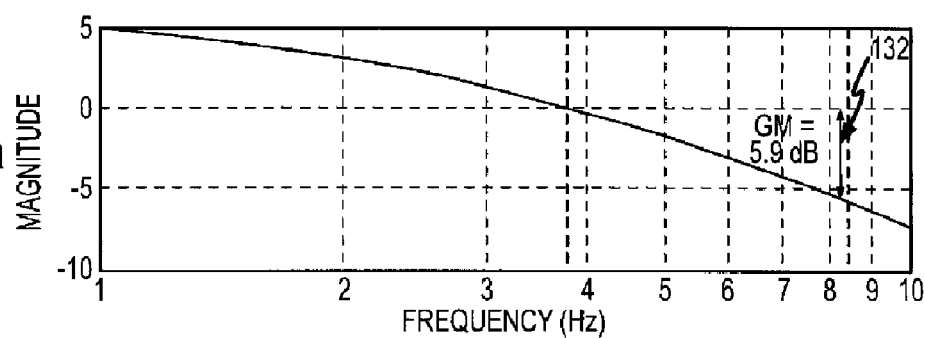
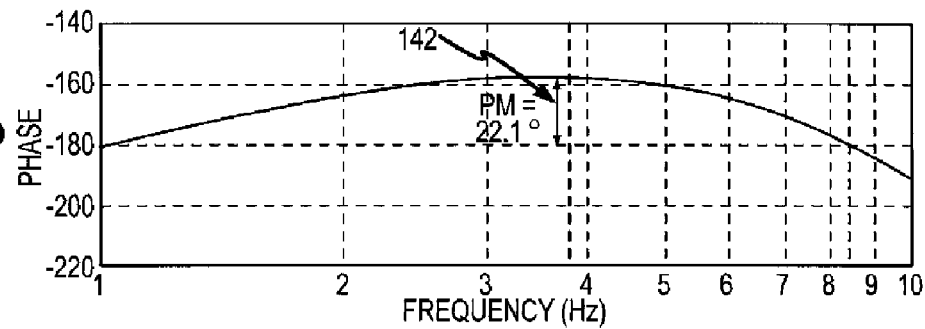

FLIGHT CONTROL SYSTEM AND METHOD OF USING PIEZOELECTRIC MODAL SENSORS TO MITIGATE FLEXIBLE BODY DYNAMICS

BACKGROUND OF THE INVENTION

1. Field of the Invention

This invention relates to flight control systems that mitigate the effects of flexible body dynamics on flight vehicles such as missiles.

2. Description of the Related Art

Missile flight control systems receive rate and acceleration measurements from an on-board Inertial Measurement Unit (IMU) and apply a flight control law to actuate control surfaces (e.g. fins) to effectuate a guidance command. The missile's airframe flexes as it translates through the air. These flexible body dynamics introduce an unwanted signal to the control loop response. The flight control system must be designed to compensate for these flexible body dynamics or the system could have self-exciting vibrations. In the case where these vibrations are not bounded, catastrophic structural damage and mission failure will occur. In the case where the vibrations remain finite, the additional frequency content in the actuator commands can lead to actuator failure due to overheating and mission failure.

The airframe 10 experiences several different types of flexible body modes under the different loads as it flies through the air including a $1^{st}$ lateral bending mode 12 and a $2^{nd}$ lateral bending mode 14 as shown in FIGS. 1a and 1b, respectively, along the pitch and yaw channels, a $1^{st}$ torsional mode and various fin modes. The $1^{st}$ lateral bending mode is the most important. In a long cylindrically shaped body such as found in a missile or comparable flight vehicle, the $1^{st}$ lateral bending mode has the lowest frequency that lies within or within about a decade above the gain cross-over of the controller bandwidth. The specific amplitude and frequency depend on the missile design, the uncertainty in the manufactured components such as the actuators and the changing load conditions. If the flight controller has sufficient bandwidth and minimal latency it may be possible to actuate the control surface to directly compensate the $1^{st}$ lateral bending mode but this requires a lot of power and places considerable stress on the actuators and flight controller. Other higher frequency modes including the $2^{nd}$ lateral bending, torsion and fin modes have less effect on the control loop.

In the absence of these flexible body modes the open loop frequency response of a well designed control loop will have the following typical characteristics: 1) high gain at low frequency for good command tracking and disturbance rejection; 2) a slope of between 20 and 40 dB/decade as the gain crosses 0 dB ("gain crossover") for good robustness to time delays; and 3) a slope of at least 20 dB decade above the crossover frequency to attenuate high frequency noise. The difference between the phase and −180° at the gain cross-over is referred to as the "phase margin" and is a measure of the control loop's sensitivity to unmodeled time delays. The difference between the gain and 0 dB at the frequency where the phase passes through −180° (the phase cross-over) is referred to as the "gain margin" and is a measure of the sensitivity of the control loop to gain uncertainties. These margins are normally not independent, as a change in the gain response affects the gain at the phase crossover (gain margin) as well as the frequency at which the gain crossover occurs, which is the frequency used to compute the phase margin. In general, the open-loop phase margin and gain margin should be large to ensure a robust control loop. If the phase-margin is too small then small unmodeled time delays in the real system could result in an unstable control loop. If the gain-margin is too small then small variations in the real system gain could result in an unstable control loop. In missiles and other flight vehicles, the $1^{st}$ lateral bending mode is typically large enough that the gain of the control loop at the mode frequency, which would otherwise be −20 to −30 dB, is greater than 0 dB, and thus has the potential to become self-excited and destabilize the control loop. Accordingly, the flight control system must be configured to attenuate at least the $1^{st}$ lateral bending modes and preferably the other higher order modes as well.

One way to compensate for the $1^{st}$ lateral bending mode is to design the actuator, fins, and IMU placement so that the control loop actively dampens the mode. This is referred to as a phase-compensated control system, in which the actuators are designed to have a higher bandwidth and to actively dampen the $1^{st}$ lateral bending mode. As a result, the phase is suitably 50-65 degrees (ideally 180 degrees) out-of-phase at the $1^{st}$ lateral bending mode frequency so that the control loop does not reinforce the mode and cause it to self-excite. This approach can work but is expensive because the actuator mechanisms must be carefully designed and manufactured to dampen and not excite the $1^{st}$ lateral bending modes and the location of the IMU is critical.

A more common approach is a gain-compensated control system in which digital filters are used to attenuate the flexible body modes. As shown in FIG. 2, a typical flight control system 20 (shown here for the pitch channel) includes a guidance system 22 that provides a guidance command $A_{ZC}$, typically a lateral acceleration command, an IMU 24 including accelerometers and gyros that provide measurements of the acceleration $A_{ZM}$ and pitch rate $Q_M$, and a flight controller 26 that applies a control law to the guidance command and measured data to issue commands to actuate the control surfaces and effectuate the guidance command. Rate feedback is typically used to augment the stability of the airframe, and acceleration feedback is used to track the guidance command.

The measured rate and acceleration include a desired rigid airframe component that is needed to property control the missile and an unwanted flexible airframe component due to the various flexible body modes. To avoid further exciting the flexible airframe dynamics, a set of digital filters 28 is used to attenuate the unwanted flexible airframe component of the measured rates and accelerations so that the measurements more closely represent only the rigid airframe component. A $1^{st}$ lateral bending mode digital notch filter (NF) 30 is specially designed for both the yaw and pitch measured rates and accelerations to provide gain-compensation to adequately suppress the effects of the $1^{st}$ lateral bending modes. Higher frequency mode filters 32 are a suitable combination of low-pass filters (LPFs) and NFs that are designed to attenuate the measured $2^{nd}$ lateral bending, torsional and fin modes and not introduce significant phase loss or latency.

As shown in FIG. 3a, a typical 1st lateral bending mode digital notch filter 30 has a gain response 50 to attenuate the measured response of the 1st lateral bending mode. A characteristic of causal digital notch filters is that they start to induce phase loss approximately a decade below the notch, and that the wider and deeper the notch the greater the phase loss. The phase response 52 associated with the gain response 50 is shown in FIG. 3b. In this case the digital notch filter introduces significant phase loss, approximately 10°, at frequencies within the flight control bandwidth (in this case <10 Hz). Phase loss is a non-dimensional measure of latency which negatively affects the flight control system's ability to track the input commands. Too much latency can result in an unstable closed loop system. If the notch filter could be designed to be very narrow and only deep enough to attenuate the mode sufficiently, the amount of latency may be acceptable. However, this is impractical due to the inherent uncertainty of the flexible dynamics that results from the variability that occurs during the missile manufacture. Furthermore, the mode frequency and shape change as fuel is consumed, or as the missile stages are dropped. Additionally the amount of attenuation needed varies with flight condition (Mach number and altitude). Often, the digital notch filters are designed to shift with the frequency, and vary with flight condition, but manufacturing uncertainty necessitates wider and deeper notch filters. As digital notch filters are inexpensive to implement and well understood, they are an adequate solution for those applications that can tolerate the bandwidth limitations they place on the flight control system.

As shown in FIGS. 4a-4b and 5a-5b, the magnitude 53 of the frequency response exhibits a gain margin 54 of approximately 3.4 dB and the phase 55 exhibits a phase margin 56 of approximately 16.9°. Furthermore, the gain response at the $1^{st}$ lateral bending mode frequency peaks up to about −10 dB even with the digital notch filter. In many systems this would be considered either marginally acceptable or unacceptable because both the gain margin and phase margin are lower than would typically be allowed (4 dB and 20° being typical gain and phase margin design goals).

Another approach is to carefully position multiple IMUs about the airframe and process the data to cancel out the effects of the lower frequency flexible body dynamics. This approach has been used in very large expensive rockets whose lower frequency flexible body mode frequencies are within the bandwidth of the flight control system required to stabilize the rocket. These rockets can afford both the cost, additional space, and additional weight associated with multiple IMUs. This approach is not practical for small low cost lightweight missiles whose lower frequency flexible body mode frequencies are at least ½ a decade to a decade above the bandwidth of the flight control system.

Customers are demanding lighter cheaper missiles and higher performance in both speed and maneuverability. These requirements are directly at odds. Lighter cheaper and consequently more compliant airframes experience larger amplitude flexible body dynamics at lower frequencies than a more expensive stiffer airframe, particularly the $1^{st}$ lateral bending mode which limits the flight control bandwidth and therefore the speed of response. Current solutions are too expensive, bulky and heavy, or cause too much latency so that they fail the maneuverability specification.

SUMMARY OF THE INVENTION

The present invention provides a simple and inexpensive mechanism to sense and mitigate the effects of flexible body dynamics on the flight control system for a flight vehicle.

This is accomplished with one or more modal sensors that are each configured to measure the rate and possibly acceleration for a flexible body mode of the flight vehicle. The modal sensor's rate and suitably acceleration are subtracted from the rate and acceleration measured by the IMU such that the values provided to the flight controller more closely represent only the rate and acceleration of the flight vehicle's rigid airframe component. The sensor must be capable of sensing the mode over variations in the modal frequency without inducing additional phase loss in the control loop in order to maintain suitable gain and phase margins. In an embodiment, each sensor is configured to sense one and only one mode, e.g. a $1^{st}$ lateral bending mode. Multiple modes can be sensed using multiple sensors each configured for a specific mode.

In an exemplary embodiment, the sensors are formed of a piezoelectric material to sense the strain caused by the flexure of the body induced by the flexible body dynamics. Because piezoelectric sensors are very thin and lightweight and the piezoelectric effect is charge based, the sensors have a very high bandwidth with approximately zero phase well beyond the bandwidth of the flight control loop, and thus do not induce phase loss in the control loop when used to cancel the flexible body motion sensed by the IMU. Each piezoelectric sensor is placed on the airframe or possibly embedded in a composite airframe and must cover enough surface area so that the thin-film piezoelectric strain sensor can be used as a modal sensor. The particular mode that is sensed is determined by the patterning of the sensor's surface electrode, which is proportional to the strain distribution induced in the airframe by that flexible body mode. Furthermore, the piezoelectric sensors sense changes in the mode frequency and thus can adapt to structural variations in the flight vehicle, e.g. consumption of fuel, temperature changes or manufacturing variances. A readout circuit can be configured to measure the piezoelectric effect to determine the rate or the acceleration of the flexible body mode.

In another exemplary embodiment, a pair of piezoelectric sensors configured to sense only a $1^{st}$ lateral bending mode are placed on the airframe along the pitch and yaw axes, respectively. The sensed $1^{st}$ lateral bending mode rate and possibly acceleration are subtracted from the measured pitch and yaw values provided to the flight controller by the IMU. The higher order modes ($2^{nd}$ lateral bending, $1^{st}$ torsional and fin modes, etc.) are suitably attenuated using conventional digital NFs and LPFs.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 9a-9b are schematic diagrams of readout circuits for strain rate and acceleration;

FIGS. 10a-10b and 11a-11b are gain and phase plots of the frequency response of the open loop pitch channel flight control system using a piezoelectric sensor to reduce the impact of the $1^{st}$ lateral bending mode;

DETAILED DESCRIPTION OF THE INVENTION

The present invention provides a simple and inexpensive mechanism to sense and mitigate the effects of flexible body dynamics on the flight control system for a flight vehicle without causing latency problems in the control loop. Modal sensors provide rate and possibly acceleration information for at least one flexible body mode of the flexible airframe component, suitably at least the $1^{st}$ lateral bending mode for both pitch and yaw, so that the data provided to the flight controller more closely represents only the rate and acceleration of the flight vehicle's rigid airframe component, particularly at frequencies at or below the flight control bandwidth. Piezoelectric sensors can be configured to sense the strain induced by particular flexible body modes without inducing additional phase loss in the control loop. As sensor technology continues to advance, other known or new technologies may also provide the capability to sense these flexible body modes without phase loss. This approach is generally applicable to any flight vehicle whose airframe experiences flexible body modes during flight including missiles, lift stage rockets and possibly other aircraft.

Figure 6:
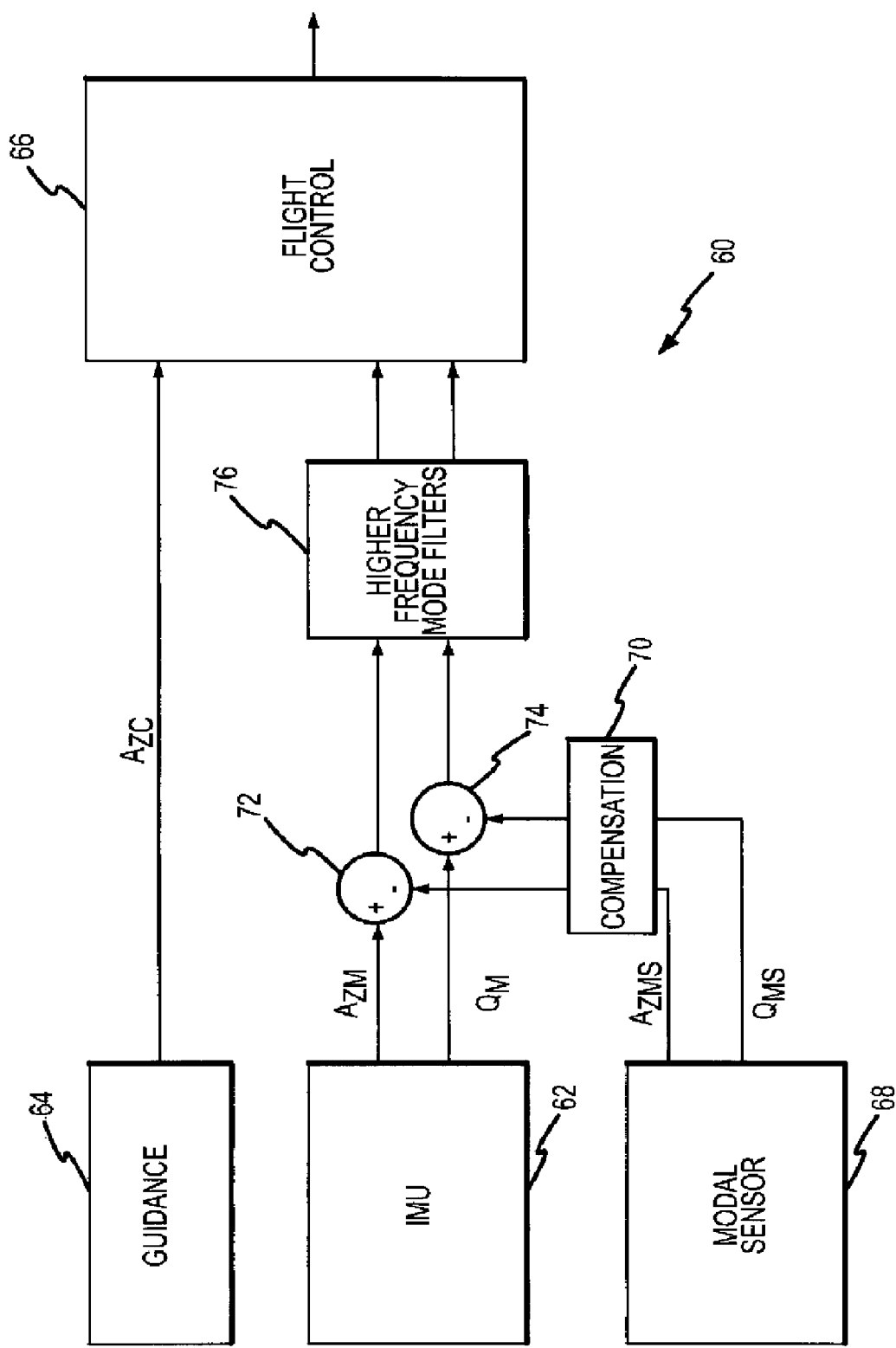
FIG. 6 is a block diagram of a flight control system that uses a piezoelectric sensor to compensate for effects of the 1st lateral bending modes.

As shown in FIG. 6, in an exemplary embodiment a pitch channel flight control system 60 includes an IMU 62, preferably only one in relatively small lightweight missiles, having gyros and accelerometers that provide rate and acceleration information for each of the yaw, pitch and roll channels, a guidance system 64 that provides a guidance command $A_{ZC}$ and a flight controller 66 that processes the guidance command $A_{ZC}$, measured acceleration $A_{ZM}$ and measured pitch rate $Q_M$ signals in accordance with a flight control law to control aerodynamic or propulsive actuators to effectuate the guidance command. In a flight control system that takes acceleration commands from guidance, rate feedback is typically used for augmenting the natural stability of the airframe and the error between the commanded and measured acceleration is used to turn the missile to achieve the desired trajectory. Any additional phase-loss (latency) on the rate feedback signal will reduce the relative stability of the airframe while latency on the measured acceleration will increase the airframe's turning time constant. In some systems, the IMU may include only gyros to measure rate in which case the guidance command specifies a turning rate instead of a lateral acceleration. In this case, additional phase-loss (latency) on the rate feedback signal will reduce the relative stability and turning time constant of the airframe.

As shown here for the pitch channel, to improve flight control, a modal sensor 68 is attached to the airframe and configured to sense the rate and possibly the acceleration of the first $1^{st}$ lateral bending mode along the pitch channel. The sensed conditions are suitably passed through compensation 70 adjusted so that the output of the modal sensor is scaled and phase delayed to match the pitch channel rate and acceleration output by the IMU at the frequency of the bending mode. The sensed rate and acceleration are subtracted at summing nodes 72 and 74, respectively, from the values provided by the IMU for the pitch channel. The $1^{st}$ lateral bending mode is effectively removed from the flight control rate and acceleration feedback signals without additional phase loss. A similar configuration is included in the yaw channel. The higher order flexible body modes ($2^{nd}$ lateral bending, $1^{st}$ torsional and fin modes) for each channel are suitably processed using conventional digital notch and low-pass filters 76. The flight controller can use the same flight control law as is used in the conventional digital filtering configurations. However, the improved performance of the modal sensors may allow for changes in the flight control law to achieve higher performance. Alternately, additional piezoelectric sensors may be configured to sense one or more of the higher order modes. Furthermore, a digital notch filter may be used to filter the acceleration of the $1^{st}$ lateral bending mode since acceleration is less sensitive to phase loss or, as mentioned above, the flight controller may omit acceleration entirely.

Figure 7:
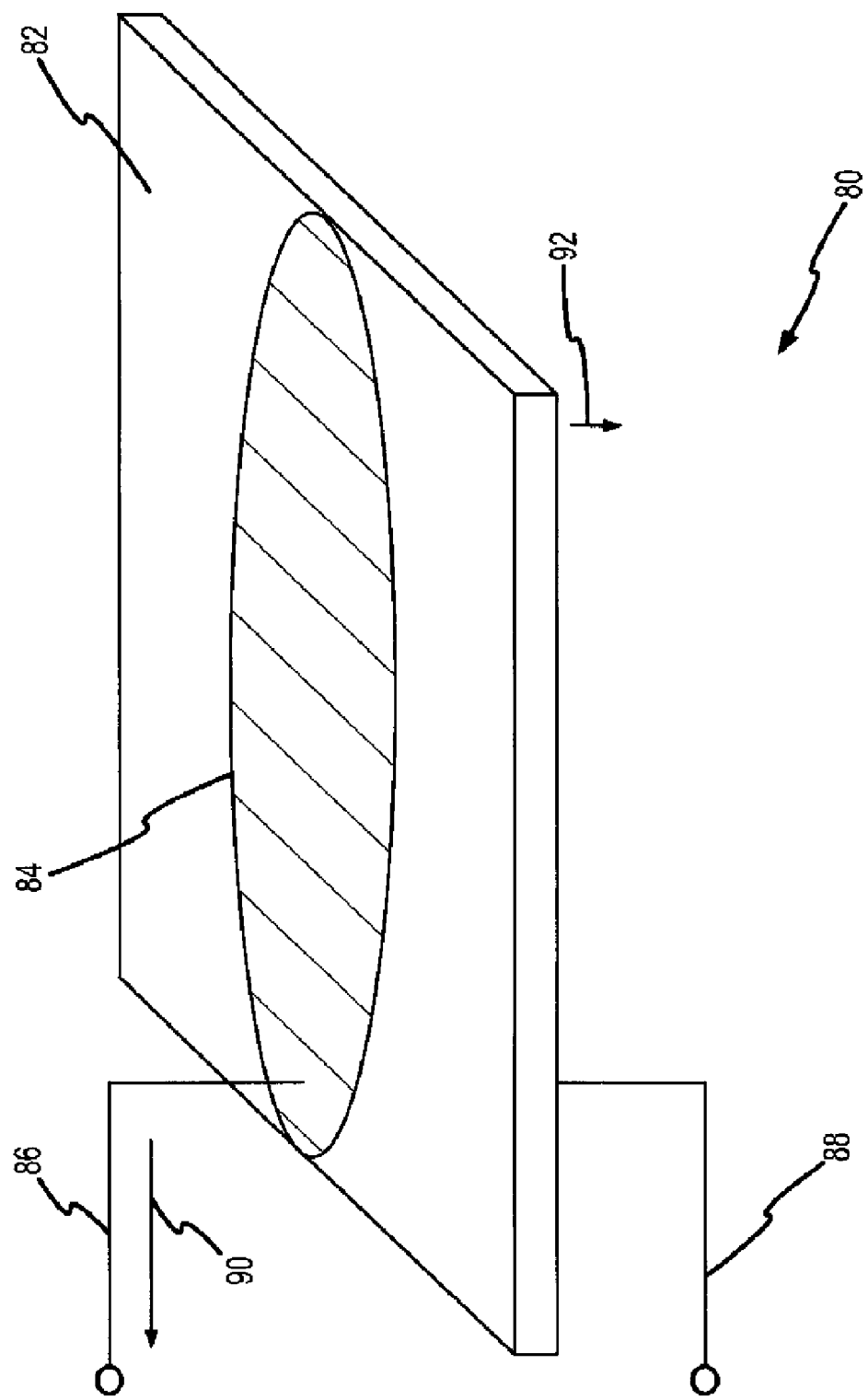
FIG. 7 is a diagram of a piezoelectric sensor configured to sense a $1^{st}$ lateral bending mode.

As shown in FIG. 7, a piezoelectric sensor 80 includes a piezoelectric lamina 82, surface electrodes 84 on both sides of the lamina and wires 86 and 88 connected to the respective electrodes to readout an electrical signal 90 caused by strain applied to the lamina (the "piezoelectric effect"). The bottom electrode may be a sheet or similarly patterned as the top electrode as it is the overlap between the two surface electrodes that determines the sensitivity of the piezoelectric sensor to the flexible modes of the structure to which it is attached. During manufacture, an electric field is applied normal to the lamina to "poll" the material and align the electric dipoles in the polling direction 92. In general, the lamina is formed from a ferroelectric material that exhibits the piezoelectric effect. In an exemplary embodiment, the lamina is constructed from a polyvinylidene fluoride film, commonly referred to as PVDF or $PVF_2$, which exhibits a strong piezoelectric effect and thus provides a sensor of negligible thickness and weight. $PVF_2$ is also characterized by such properties as flexibility, ruggedness, softness, lightweight, a relatively low acoustic impedance and a low Q value, which are well suited to flight vehicle conditions.

Piezoelectric sensors are well suited to sense flexible body modes in flight vehicles. First, because the sensors respond to strain they will sense the flexible body modes that contribute to the flexible airframe component but will not respond to the rate or acceleration of the rigid airframe. Thus, the piezoelectric sensors sense only the flexible body modes that need to be attenuated. Second, because the sensor is thin and very lightweight and the effect is electrical, the sensor has a very high bandwidth that exhibits virtually zero phase to frequencies well above the gain cross-over of flight control systems of interest. Third, the piezoelectric sensor inherently adjusts to changes in the modal frequency In general, the piezoelectric lamina will respond to some degree to any applied strain. The sensor can be configured to respond to a particular flexible body mode or modes by controlling the geometry of the lamina (length, width and thickness) and the geometry of the surface electrodes. In general, the lamina should be thin and the surface electrodes patterned proportional to the modal strain distribution along the length of the airframe (a "free-free beam"). In theory it is possible to pattern the electrodes to sense multiple flexible body modes. However, this may require a tradeoff in the efficacy of sensing any one mode and may complicate the calibration of the readout electronics. Because the piezoelectric sensors are very small and lightweight and relatively inexpensive, it may be preferable to configure the sensor and readout electronics to sense only one particular mode. As shown in FIG. 7, surface electrode 84 is patterned proportional to the modal strain distribution of the $1^{st}$ lateral bending mode. A general discussion of the theory of piezoelectric sensors and their configuration as modal sensors is provided in C. K. Lee "Piezoelectric laminates: Theory and Experiments for Distributed Sensors and Actuators", Intelligent Structural Systems, Kluwer Academic Publishers, pp 75-107 and 114-125, 1992, which is hereby incorporated by reference.

Figure 1A:
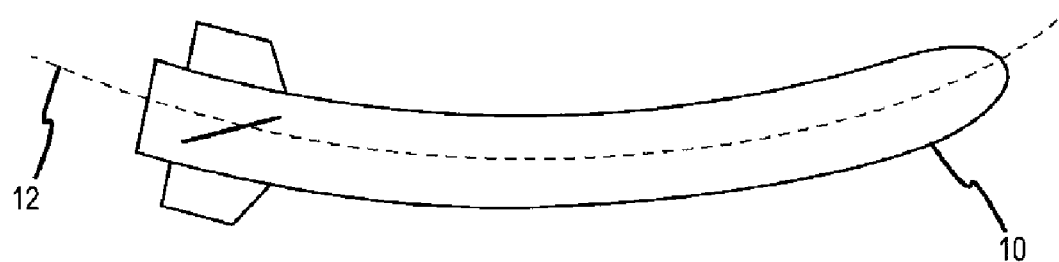
FIGS. 1a and 1b, as described above, are diagrams of a flight vehicle illustrating the exaggerated shape of first and second lateral bending modes, respectively.
Figure 1B:
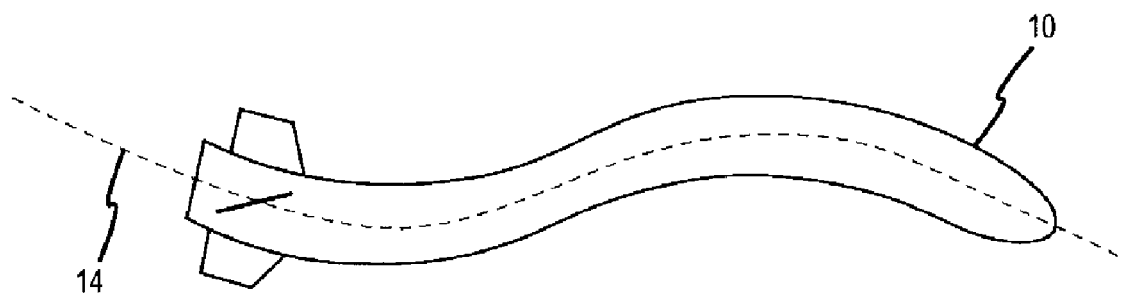
Figure 2:
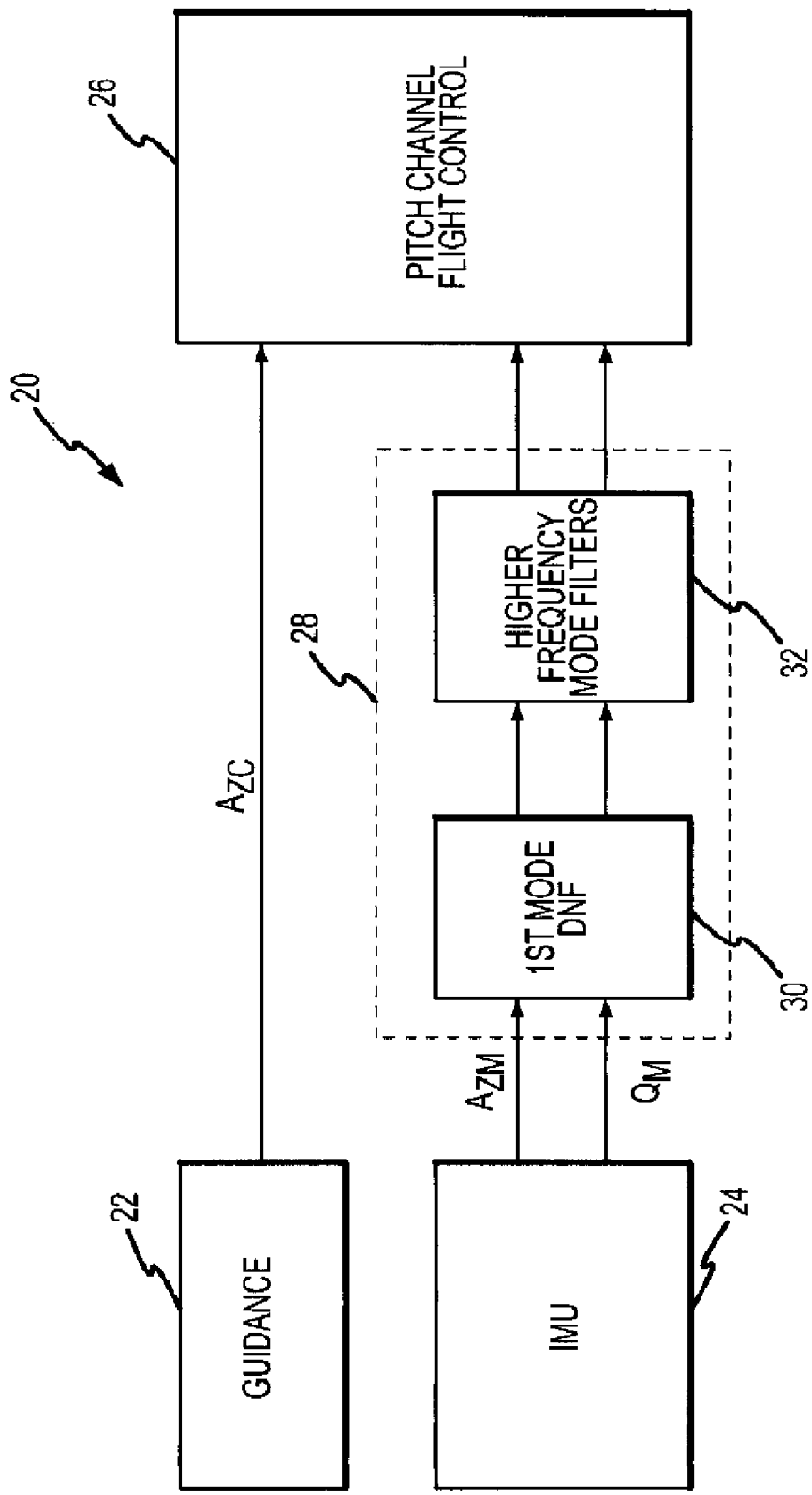
FIG. 2, as described above, is a block diagram of a known flight control system that uses digital filtering to provide gain compensation of the first lateral bending mode and other higher order modes.
Figure 3A:
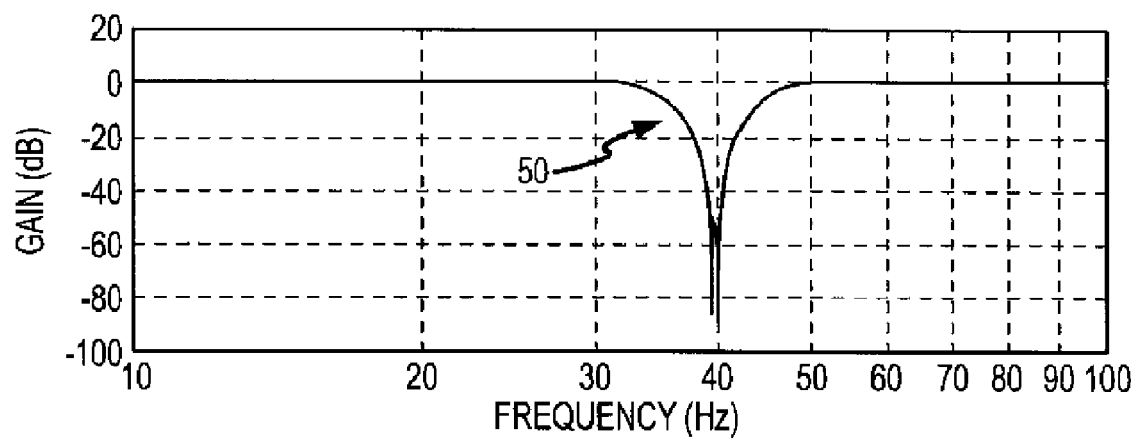
FIGS. 3a and 3b, as described above, are gain and phase plots of a notch filter.
Figure 3B:
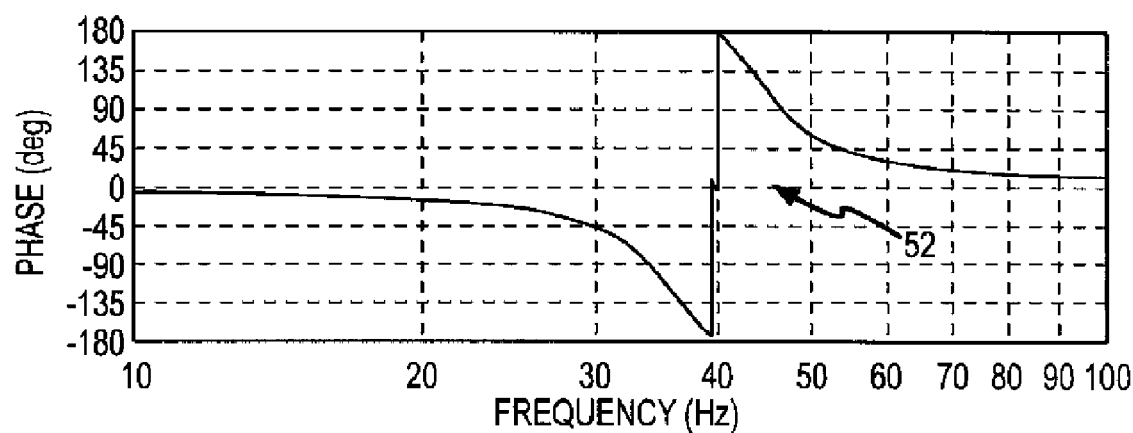
Figure 4A:
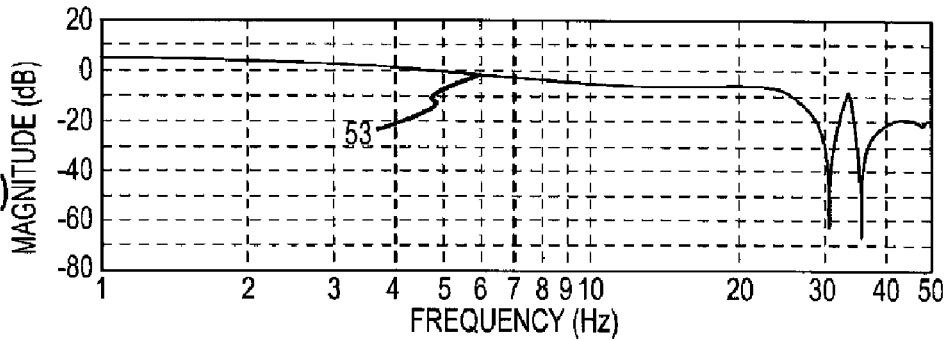
FIGS. 4a-b and 5a-b, as described above, are gain and phase plots of the frequency response of the open loop pitch channel flight control system using gain-stabilization of the first lateral bending mode.
Figure 4B:
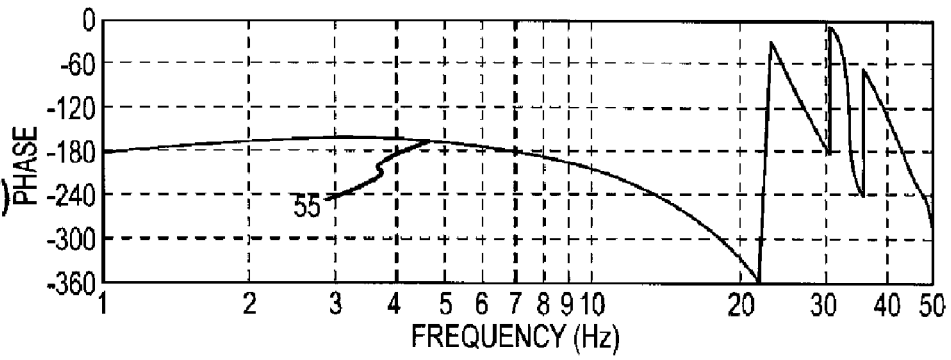
Figure 5A:
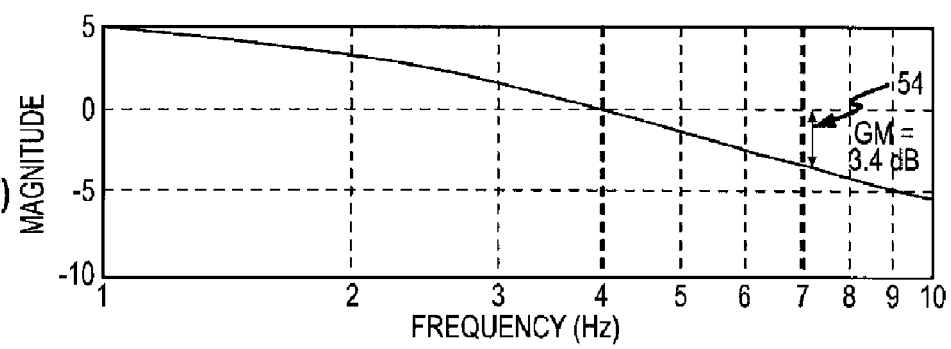
Figure 5B:
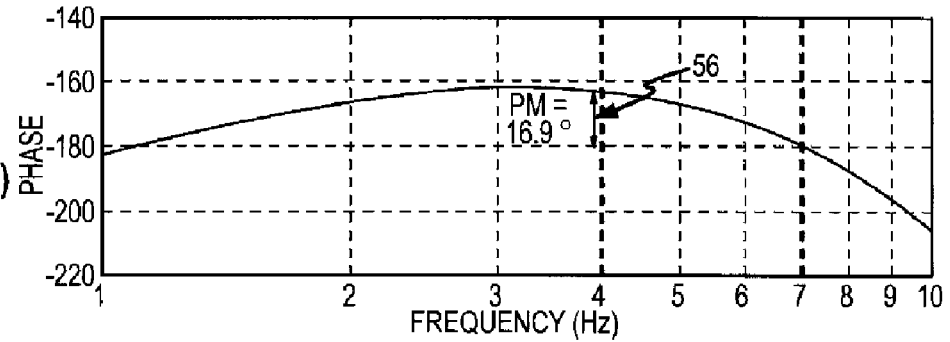
Figures 8A, 8B:
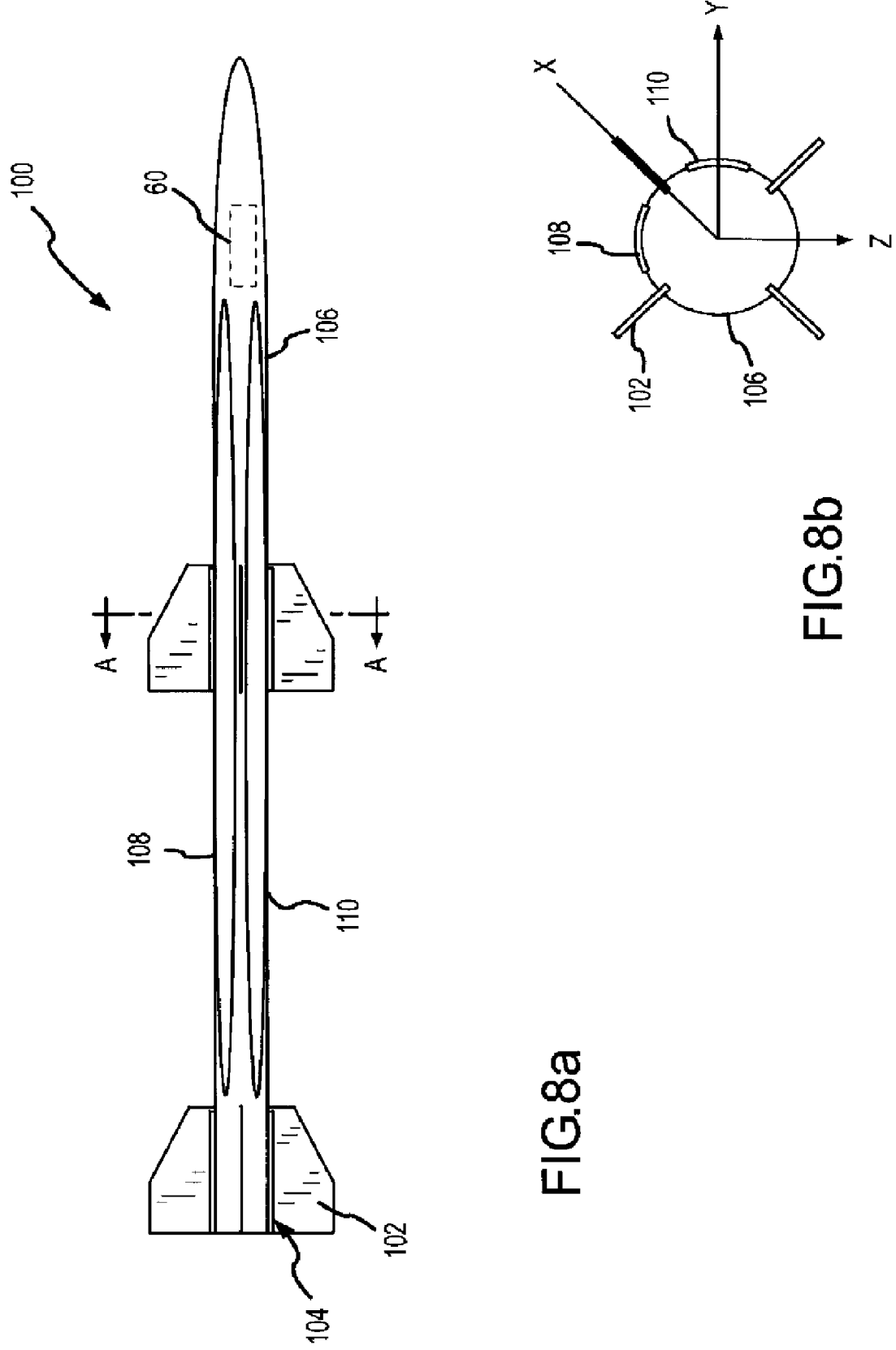
FIGS. 8a-8b are diagrams of a missile formed with pitch and yaw channel piezoelectric $1^{st}$ lateral bending mode sensors.

As shown in FIGS. 8a-8b, a missile 100 includes a number of fins 102 and fin actuators 104 on an airframe 106 and a flight control system 60. A $1^{st}$ lateral bending mode piezoelectric sensor 108 is placed in the pitch channel along the length of the airframe and a $1^{st}$ lateral bending mode piezoelectric sensor 110 is placed in the yaw channel along the length of the airframe. As the missile flies through the air and flexes under the varying load conditions, sensors 108 and 110 will sense only the $1^{st}$ lateral bending modes as exemplified by FIG. 1a along the pitch and yaw channels, respectively. The maneuver plane in which the airframe flexes will change during flight. The flex in the maneuver plane is decomposed into the orthogonal pitch and yaw components, which are sensed by the respective modal sensors. The sensed rate and acceleration of the bending mode in the pitch and yaw channels are subtracted from the measured rate and acceleration from the respective channels and passed to the flight controller. Due to imperfections in the electrode patterning, the sensors may pick up very small amounts of other flexible body modes but not enough to affect the flight control.

As shown in FIGS. 9a-9b, the readout electronics include an impedance matching circuit 120 and an A/D converter 122. In order to read out a rate for the first lateral mode, the impedance matching circuit 120 must be configured to read out the time rate of change of the displaced charge in the sensor, i.e. the current. The acceleration is the time rate of change of the current. As shown in FIG. 9a, an embodiment for reading out the strain rate includes an operational amplifier 124 whose output is feedback to its inverting input through a variable resistor 126 and whose non-inverting input is grounded. The resistance level is set to calibrate the sensor to the IMU. As shown in FIG. 9b, an embodiment for reading out the acceleration rate includes an operational amplifier 127 whose output is feedback to its inverting input through a variable RC network 128 and whose non-inverting input is grounded. The RC time constant is set to calibrate the sensor to the IMU. The readout circuits may be connected to the same or different piezoelectric sensors to readout strain and acceleration. Alternately, it may be possible to a single circuit that measures both strain rate and acceleration.

The same airframe that was tested using conventional digital notch filters and LPFs with the frequency response of the control loop shown in FIGS. 4a-4b and 5a-5b was tested using piezoelectric sensors to sense the $1^{st}$ lateral bending modes in the pitch and yaw channels in place of the conventional notch filters for the $1^{st}$ lateral bending modes. The open-loop frequency response of the pitch channel flight control, gain 130 and phase 140, is plotted over a range that extends past the $1^{st}$ lateral bending mode frequency, ~34 Hz, (FIGS. 10a-10b) and over a narrow range that includes the gain and phase cross-over frequencies (FIGS. 11a-11b). As can be seen in FIG. 11a, this flight control loop exhibits a gain margin 132 of 5.9 dB measured at the phase cross-over frequency (~8.2 Hz), which is 2.5 dB better than obtained with the conventional gain-compensation approach using notch filtering shown in FIG. 5a. Furthermore, at the $1^{st}$ lateral bending mode frequency the gain is approximately −20 dB whereas in the conventional gain-compensation approach the gain peaks up to about −12.2 dB. Likewise, as can be seen in FIG. 11b, this flight control loop exhibits a phase margin 142 of 22.1° measured at the gain cross-over frequency (~3.8 Hz), which is 5.2° better than obtained with the conventional gain-compensation approach shown in FIG. 5b.

A comparison of the stability margins indicates that the inclusion of a pitch mode sensor results in an increase of approximately 2.5 dB rigid body gain margin (73% increase), an increase of approximately 5.2° rigid body phase margin (31% increase), and a −7.8 db improvement (64% improvement) in the flexible body gain margin at the $1^{st}$ lateral bending mode frequency. This is significant because even with gain and filter optimization, the use of a digital notch filter to attenuate effects of the $1^{st}$ lateral bending mode dynamics on the rate and acceleration feedback resulted in a design that didn't meet the required minimum rigid body stability margins of (4 dB gain margin and 20° phase margin). This problem was exacerbated by the width of the notch filter required to deal with the 10% uncertainty in the $1^{st}$ lateral bending mode frequency. The proposed modal sensor approach inherently senses only the $1^{st}$ lateral bending modes regardless of the frequency at which they occur. Additionally, if desired, the extra stability margin above the requirements could be traded-off for speed of response, resulting in a more agile missile.

Figure 12:
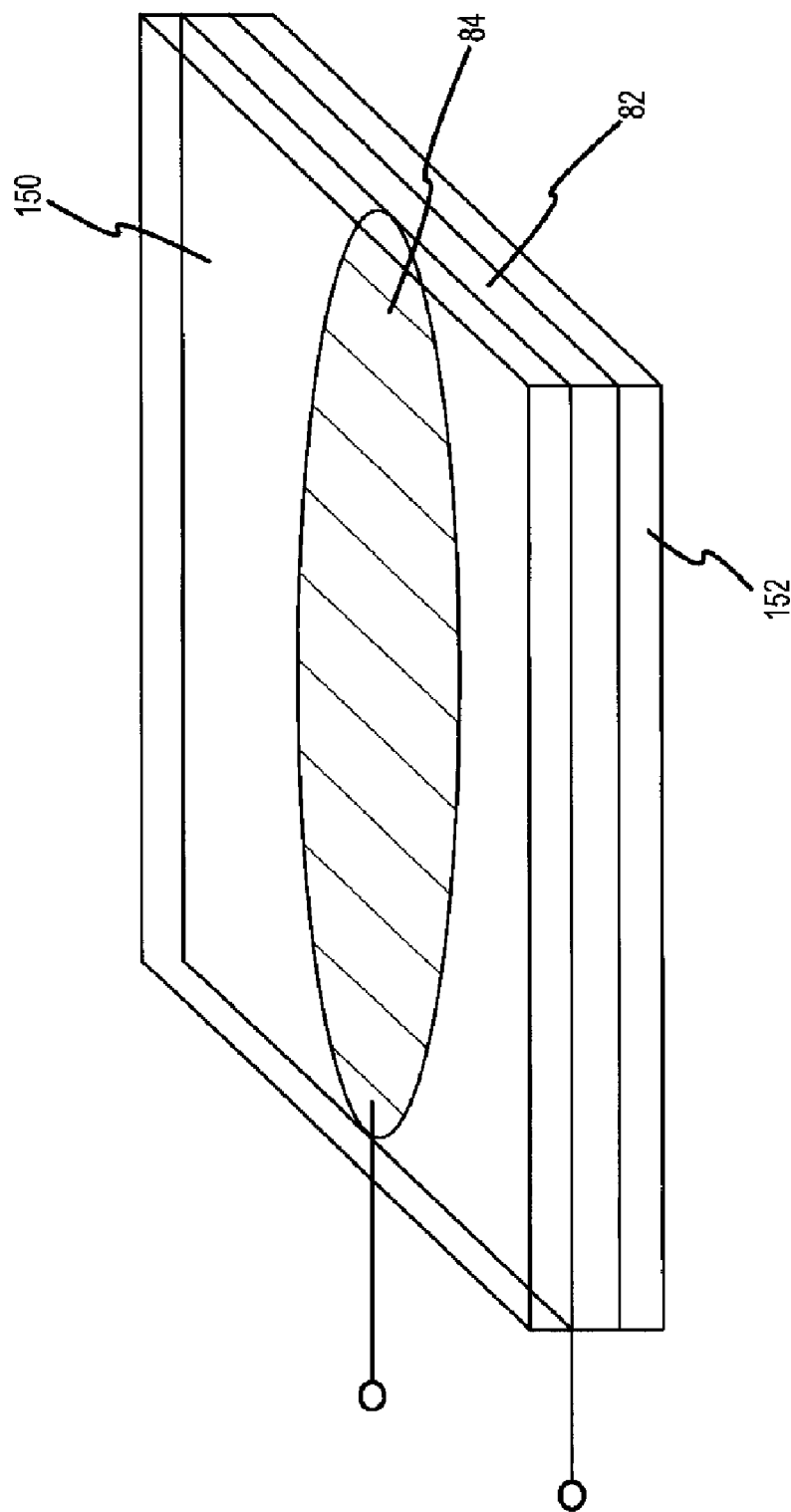
FIG. 12 is a diagram of a piezoelectric sensor that is part of a laminate composite.
Figure 13:
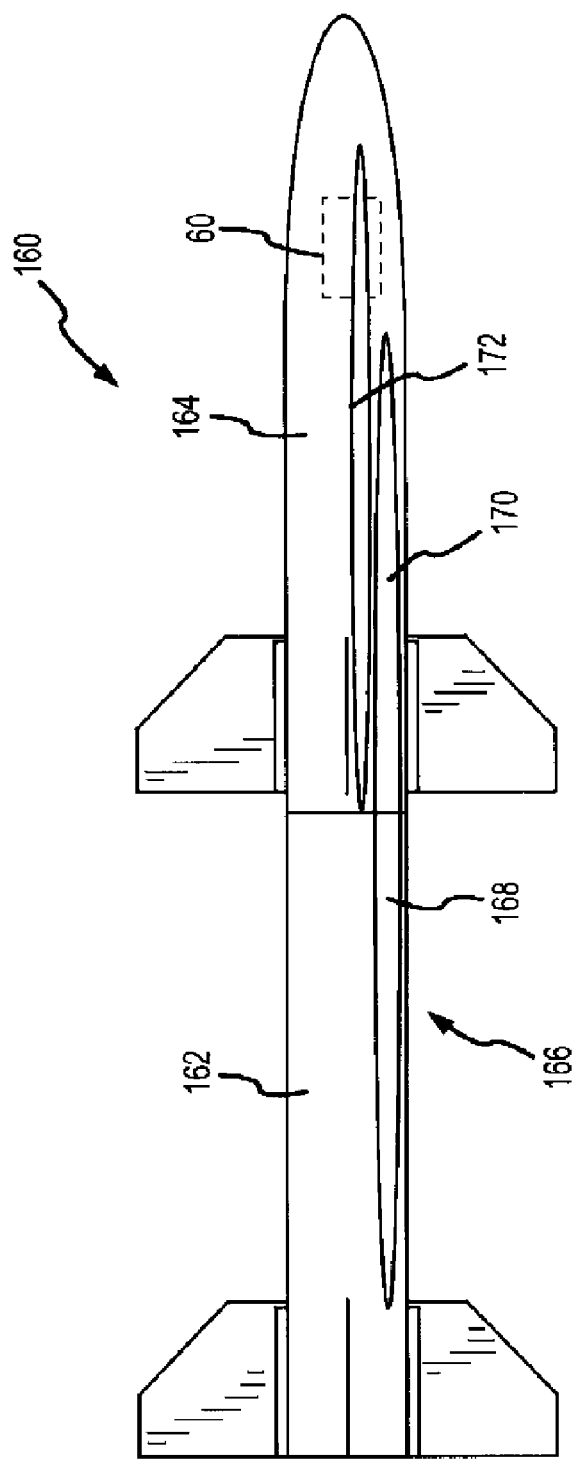
FIG. 13 is a diagram of a missile including a pair of piezoelectric sensors that span multiple missile segments.

The piezoelectric sensors 80 can be placed on the airframe as discrete components. Alternately, as shown in FIG. 12, the piezoelectric lamina 82 and surface electrodes 84 can be embedded in composite layers 150 and 152 that form a 'skin' on the aircraft in place of the conventional metal surface. Sensors for the various modes for a given channel can be stacked within the composite.

Some missiles 160 are manufactured in segments 162 and 164. This may necessitate forming the piezoelectric sensor 166 in segments 168 and 170 on the missile segments and than electrically connecting the sensor segments when missile is assembled. Furthermore, some missile may drop a lift stage segment during flight. If segment 162 were dropped, sensor 166 would no longer be effective to sense the $1^{st}$ lateral bending mode. One option is to fly the remaining missile to the target without compensating for the bending mode. This may be adequate as the remaining missile is much shorter and the mode frequency would be higher. Alternately, another sensor 170 could be formed along the length of the remaining missile segment 164 to provide compensation for the remainder of the flight.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A flight vehicle, comprising:
   an airframe including a plurality of frame segments;
   at least one control surface for affecting the flight of the airframe;
   at least one actuator for actuating said control surface;
   a measurement unit for measuring a rate of the airframe, said measured rate including a rigid airframe component and a flexible airframe component;
   at least one modal piezoelectric sensor that spans at least two of the frame segments of the airframe, said sensor configured to measure a rate of a $1^{st}$ lateral bending mode of the flexible airframe component, said sensor's rate being subtracted from the measured rate to produce an adjusted measured rate that more closely represents only the rigid airframe component; and
   a flight controller that receives a guidance command and the adjusted measured rate and issues a command signal to control the actuator.

2. The flight vehicle of claim 1, wherein said measurement unit measures an acceleration of the airframe that is provided to the flight controller, said at least one modal piezoelectric sensor being configured to measure an acceleration of the $1^{st}$ lateral bending mode that is subtracted from the measured acceleration such that the measured acceleration provided to the flight controller more closely represents only the rigid airframe component.

3. The flight vehicle of claim 1, wherein the flight vehicle comprises only one said measurement unit.

4. The flight vehicle of claim 1, wherein the piezoelectric sensor comprises:
   a pair of surface electrodes on either side of a piezoelectric lamina, at least one said surface electrode patterned proportional to the strain distribution of the $1^{st}$ lateral bending mode, and
   a circuit that reads out the rate of the $1^{st}$ lateral bending mode from the surface electrodes.

5. The flight vehicle of claim 4, wherein the piezoelectric sensor further comprises another circuit that reads out the acceleration of the $1^{st}$ lateral bending mode from the surface electrodes.

6. The flight vehicle of claim 1, wherein at least one piezoelectric sensor is embedded in a composite skin on the airframe.

7. The flight vehicle of claim 1, wherein the command signal and actuation of the control surface are unresponsive to the flexible airframe component of the measured rate.

8. A flight vehicle, comprising:
   an airframe including a plurality of frame segments, at least one of the plurality of frame segments configured to be dropped during flight;
   at least one control surface for affecting the flight of the airframe;
   at least one actuator for actuating said control surface;
   a measurement unit for measuring a rate of the airframe, said measured rate including a rigid airframe component and a flexible airframe component;
   at least one modal piezoelectric sensor that spans at least two of the frame segments of the airframe, said sensor configured to measure a rate of a $1^{st}$ lateral bending mode of the flexible airframe component, said sensor's rate being subtracted from the measured rate to produce an adjusted measured rate that more closely represents only the rigid airframe component; and
   a flight controller that receives a guidance command and the adjusted measured rate and issues a command signal to control the actuator.

9. The flight vehicle of claim 8, further comprising another piezoelectric sensor that senses a $1^{st}$ lateral bending mode of a first frame segment of the plurality of frame segments once a second of the plurality of frame segments is dropped during flight.

10. A flight control system for mitigating flexible body dynamics on an airframe including a plurality of frame segments, comprising:
    a measurement unit configured to measure a rate of the airframe, said measured rate including a rigid airframe component and a flexible airframe component;
    at least one modal piezoelectric sensor that spans at least two of the frame segments of the airframe, each said sensor configured to measure a rate for at least a $1^{st}$ lateral bending mode of the flexible airframe component, each of at least one said sensor's measured rate being subtracted from the unit's measured rate to produce an adjusted measured rate that more closely represents only the rigid airframe component; and
    a flight controller configured to receive a guidance command and adjusted the measured rate and issue a command signal to control a control surface for affecting the flight of the airframe.

11. The flight control system of claim 10, wherein said at least one modal piezoelectric sensor is patterned proportional to the modal strain distribution of the $1^{st}$ lateral bending mode to measure the rate of only the $1^{st}$ lateral bending mode.

12. The flight control system of claim 10 wherein the piezoelectric sensor comprises:
    a pair of surface electrodes on either side of a piezoelectric lamina, at least one said surface electrode patterned proportional to the strain distribution of the $1^{st}$ lateral bending mode, and
    a circuit that reads out the rate of the $1^{st}$ lateral bending mode from the surface electrodes.

13. A flight vehicle, comprising:
    an airframe having orthogonal pitch and yaw channels, said airframe including a plurality of frame segments;
    at least one control surface for affecting the flight of the airframe;
    at least one actuator for actuating said control surface;
    a measurement unit for measuring pitch and yaw rates of the airframe, said pitch and yaw rates each including a rigid airframe component and a flexible airframe component;
    a pitch piezoelectric sensor that spans at least two of the frame segments of the airframe, said sensor configured to sense a $1^{st}$ lateral bending mode of the airframe associated with the pitch channel;
    a yaw piezoelectric sensor that spans at least two of the frame segments of the airframe, said sensor configured to sense a $1^{st}$ lateral bending mode of the airframe associated with the yaw channel;
    a first circuit that reads out a strain rate from the pitch piezoelectric sensor, said strain rate being subtracted from the measured pitch rate to produce an adjusted measured pitch rate provided to the flight controller that more closely represents only the rigid airframe component; and
    a second circuit that reads out a strain rate from the yaw piezoelectric sensor, said strain rate being subtracted from the measured yaw rate to produce an adjusted measured yaw rate provided to the flight controller that more closely represents only the rigid airframe component; and
    a flight controller that receives a guidance command for the pitch and yaw channels and the adjusted measured pitch and yaw rates and issues a command signal to control the actuator to effectuate the guidance commands.

14. The flight control system of claim 13, wherein said pitch and yaw piezoelectric sensors each comprise:
    a pair of surface electrodes on either side of a piezoelectric lamina, at least one said surface electrode patterned proportional to the strain distribution of the $1^{st}$ lateral bending mode.

15. A method of mitigating flexible body dynamics on an airframe, comprising:
    measuring a rate of an airframe including a plurality of frame segments, said rate including a rigid airframe component and a flexible airframe component;
    sensing a $1^{st}$ lateral bending mode of the flexible airframe component with at least one piezoelectric sensor that spans at least two of the frame segments of the aircraft;
    measuring a rate of the $1^{st}$ lateral bending body mode;
    subtracting the rate for said $1^{st}$ lateral bending mode of the flexible airframe component from the measured rate of the airframe to produce an adjusted measured rate that more closely represents only the rigid airframe component; and processing a guidance command and the adjusted measured rate to issue a command signal to actuate a control surface to maneuver the airframe.

16. The method of claim 15 further comprising:

measuring an acceleration of the airframe, said acceleration including a rigid airframe component and a flexible airframe component;

measuring an acceleration of the sensed $1^{st}$ lateral bending mode;

subtracting the measured acceleration of the sensed $1^{st}$ lateral bending mode from the measured acceleration of the airframe to produce an adjusted measured acceleration;

processing the guidance command and the adjusted measured rate and acceleration to issue command signal to actuate the control surface to maneuver the airframe.

17. The method of claim 15 wherein said $1^{st}$ lateral bending mode is sensed piezoelectrically by forming a pair of surface electrodes on either side of a piezoelectric lamina, at least one said surface electrode patterned proportional to the strain distribution of the $1^{st}$ lateral bending mode.

* * * * *